United States Patent
Wolleschensky et al.

(10) Patent No.: US 7,855,831 B2
(45) Date of Patent: Dec. 21, 2010

(54) MICROSCOPE OBJECTIVE

(75) Inventors: Ralf Wolleschensky, Apolda (DE); Hans-Jürgen Dobschal, Kleinromstedt (DE)

(73) Assignee: Carl Zeiss MicroImaging GmbH, Jena (DE)

( * ) Notice: Subject to any disclaimer, the term of this patent is extended or adjusted under 35 U.S.C. 154(b) by 162 days.

(21) Appl. No.: 11/459,145

(22) Filed: Jul. 21, 2006

(65) Prior Publication Data

US 2007/0139763 A1    Jun. 21, 2007

(30) Foreign Application Priority Data

Jul. 22, 2005    (DE)    ........................ 10 2005 034 441

(51) Int. Cl.
  *G02B 21/02*    (2006.01)
(52) U.S. Cl. ...................................... 359/383; 359/382
(58) Field of Classification Search .................. 359/383, 359/382
  See application file for complete search history.

(56) References Cited

U.S. PATENT DOCUMENTS

| | | | |
|---|---|---|---|
| 3,743,377 A | | 7/1973 | Rosenberger |
| 4,155,622 A | | 5/1979 | Klein |
| 5,103,341 A | | 4/1992 | Ulrich et al. |
| 5,153,873 A | | 10/1992 | Spruit et al. |
| 6,023,381 A | * | 2/2000 | Bender ..................... 359/823 |
| 6,122,046 A | | 9/2000 | Almogy |
| 6,181,478 B1 | | 1/2001 | Mandella |
| 6,226,118 B1 | | 5/2001 | Koyama et al. |
| 7,218,446 B2 | | 5/2007 | Dixon et al. |
| 7,259,924 B2 | | 8/2007 | Wahl et al. |
| 7,372,545 B2 | | 5/2008 | Emer |
| 2003/0044967 A1 | | 3/2003 | Heffelfinger et al. |
| 2004/0101210 A1 | * | 5/2004 | Weinstein et al. ........... 382/284 |
| 2004/0165257 A1 | | 8/2004 | Shafer et al. |
| 2004/0240078 A1 | * | 12/2004 | Sekiyama .................... 359/726 |
| 2005/0231700 A1 | * | 10/2005 | Emer .......................... 355/55 |
| 2007/0058262 A1 | | 3/2007 | Wolleschensky et al. |

FOREIGN PATENT DOCUMENTS

| | | |
|---|---|---|
| DE | 2 225 479 | 7/1973 |
| DE | 39 15 868 A1 | 11/1990 |
| DE | 198 04 470 C1 | 8/1999 |

(Continued)

OTHER PUBLICATIONS

Z. Bor, "Distortion of femtosecond laser pulses in lenses," Optics Letters, vol. 14, No. 2, pp. 119-121 (Jan. 15, 1989).

(Continued)

*Primary Examiner*—Joshua L Pritchett
(74) *Attorney, Agent, or Firm*—Patterson Thuente Christensen Pedersen, P.A.

(57) ABSTRACT

A microscope objective including an front optical element, a plurality of optical elements spaced apart from the front element and from each other, as well as an adjusting unit. At least one of the optical elements can be displaced along the optical axis by the adjusting unit to adjust the focus of the objective. The focus of the objective is displaced relative to the front element along the optical axis and/or a temperature-induced imaging error of the objective is compensated for.

4 Claims, 2 Drawing Sheets

FOREIGN PATENT DOCUMENTS

| | | |
|---|---|---|
| DE | 199 01 219 A1 | 9/1999 |
| DE | 199 59 228 A1 | 6/2001 |
| DE | 103 038 12 A1 | 8/2004 |
| DE | 10 2004 035595 | 11/2005 |

OTHER PUBLICATIONS

"Visual Microscopic Analysis with a Diamond ATR Infrared Objective," Sensir Technologies, Application Brief AB-056.

Z. Bor, "Distortion of Femtosecond Laser Pulses in Lenses", *Optics Letters*, vol. 14, No. 2, pp. 119-121 (Jan. 15, 1989).

"Visual Microscopic Analysis with a Diamond ATR Infrared Objective," Sensir Technologies, Application Brief AB-056. © SensIR Technologies 2004.

\* cited by examiner

MICROSCOPE OBJECTIVE

RELATED APPLICATION

The current application claims the benefit of priority to German Patent Application No. 10 2005 034 441.0 filed on Jul. 22, 2005. Said application is incorporated by reference herein.

FIELD OF THE INVENTION

The invention relates to a microscope objective used, for example, in fluorescence microscopy, in particular in 2-photon microscopy.

BACKGROUND OF THE INVENTION

For experiments in fluorescence microscopy, e.g. during examination of living preparations, temperature control of the preparations is required. In order to avoid a temperature sink, the microscope objective is also heated in addition to the sample, so that the microscope objective is used, for example, in a temperature range of from 20 to 40° C. Since microscope objectives are often designed for a much narrower temperature range, spherical aberrations occur, for example, at temperatures outside said narrow temperature range, said aberrations causing the resolution to deteriorate.

Further, in microscopy, in particular in laser scanning microscopes, optical sections are often performed at different depths of the sample. For this purpose, either the sample is moved along the optical axis of the microscope objective, or the entire microscope objective is moved. In doing so, the distance between the front lens and the sample surface is modified, which may lead to mechanical vibrations at high focusing speeds. If the microscope is operated with a liquid immersion medium, these vibrations may be disadvantageously transmitted to the sample.

In view thereof, it is an object of the invention to provide a microscope objective by which the above-described difficulties can be overcome.

SUMMARY OF THE INVENTION

According to the invention, the object is achieved by a microscope objective comprising an optical front element, a plurality of optical elements spaced apart from the front element and from each other, as well as an adjusting unit, at least one of said optical elements being displaceable along the optical axis by said adjusting unit such that the focus of the objective relative to the front element is displaced in the direction of the optical axis and/or a temperature-induced imaging error of the objective is compensated for.

By modifying an individual distance or exactly one distance between two adjacent elements in the microscope objective, e.g. an undesired spherical aberration (aperture aberration) can be compensated for at least partially. Aperture aberration may occur, for example, when the microscope objective is used in an immersion microscope and the thickness of the immersion medium varies or the refractive index of the immersion medium is modified due to thermal changes. Replacement of the immersion medium with a different kind of immersion medium can also lead to such undesired aperture aberration.

By modifying at least two distances, the aperture aberration, for example, can be very well compensated for. Further, the focus of the microscope objective relative to the front element of the microscope objective can be modified. In this case, if the microscope objective is used in a microscope, optical sections can thus be effected at different depths of the sample. This is advantageously achieved while maintaining the distance of the front lens to the sample surface and, thus, the working distance. The difficulties which usually result from modifying the working distance (for example, mechanical vibrations) can thus be completely avoided. The working distance is presently understood to be the distance of the front lens from the sample surface. Further, only few elements of the microscope objective, and not the entire microscope objective, need to be moved in order to achieve focusing as desired.

Advantageously, the alteration of at least two distances in the microscope objective may also be used to compensate for temperature-induced spherical aberration. Thus, the range of applications for the microscope objective can be realized for much larger temperature ranges as compared with conventional objectives.

Two or more distances of adjacent elements may be modified by the adjusting unit. In particular, the modification may be effected such that the distances can be respectively modified or adjusted independently of each other.

The adjusting unit may comprise one or more adjusting elements. As adjusting elements, piezo elements may be used, for example.

The change in distance is preferably effected in a controlled manner. In this case, a control unit is also provided, which accordingly controls the adjusting unit. The control unit may be, in particular, the control unit of the microscope in which the microscope objective is employed.

Further, a temperature sensor may be provided, which measures (e.g. constantly) the temperature of the sample to be examined and/or of the microscope objective and transmits it to the control unit. The control unit then sets the distances as a function of the results of measurement.

The optical front element of the microscope objective (i.e. that element whose distance from the sample is the shortest when using the microscope objective) may be, for example, a lens and may be arranged at the microscope objective, in particular such that it is not displaceable in the direction of the optical axis of the microscope objective.

The microscope objective according to the invention may be used in a microscope, in particular a fluorescence microscope or a 2-photon microscope. In this case, a microscope is provided which can use the advantages of the microscope objective. For instance, the microscope may be an immersion microscope and/or a laser scanning microscope. Further, the microscope may comprise a control module which controls the adjusting unit of the microscope objective. In particular, the control module may be provided such that the microscopy method described hereinafter and its described further embodiments can be carried out with the microscope.

Further, a microscopy method is provided, which uses a microscope objective comprising an optical front element and a plurality of optical elements spaced apart from the front element and from each other, wherein, in order to compensate for a temperature-induced imaging error and/or in order to modify the focus relative to the front element in the direction of the optical axis, at least one optical element is displaced along the optical axis. This displacement allows at least one distance between the elements spaced apart from each other to be selectively modified or adjusted, respectively, so that the desired compensation of the temperature-induced imaging error (for example, a temperature-induced spherical aberration) and/or the desired modification or adjustment, respectively, of the focus can be effected.

In particular, the focus can be modified thereby in order to effect optical sections at different depths of the sample. Since the front element need not be moved for this purpose, the working distance remains constant during microscopy, thus avoiding the difficulties which result from modification of the working distance in a conventional approach, in particular when using immersion media.

Therefore, it is advantageous to displace the at least one optical element such that the compensation of the imaging error and/or the modification of the focus are effected with the working distance remaining unmodified.

In particular, the modification of the focus can be performed according to a given depth profile. This may be, for example, a periodic depth profile or any other given depth profile. The method then comprises tracking this depth profile (i.e. the focus is modified according to the depth profile), so that the optical sections can be obtained from the same depths in different samples (thus, microscopic photographs are respectively taken from the same depths in different samples).

The method comprises displacing the at least one optical element such that two or more distances of the spaced apart optical elements are independently modified. In particular, an independent modification of exactly two distances allows to achieve an excellent displacement of the focus with at the same time negligible aberrations (caused by said displacement).

BRIEF DESCRIPTION OF THE DRAWINGS

The invention will be explained in more detail below, by way of example and with reference to the drawings, wherein.

DETAILED DESCRIPTION OF THE INVENTION

Figure 1:
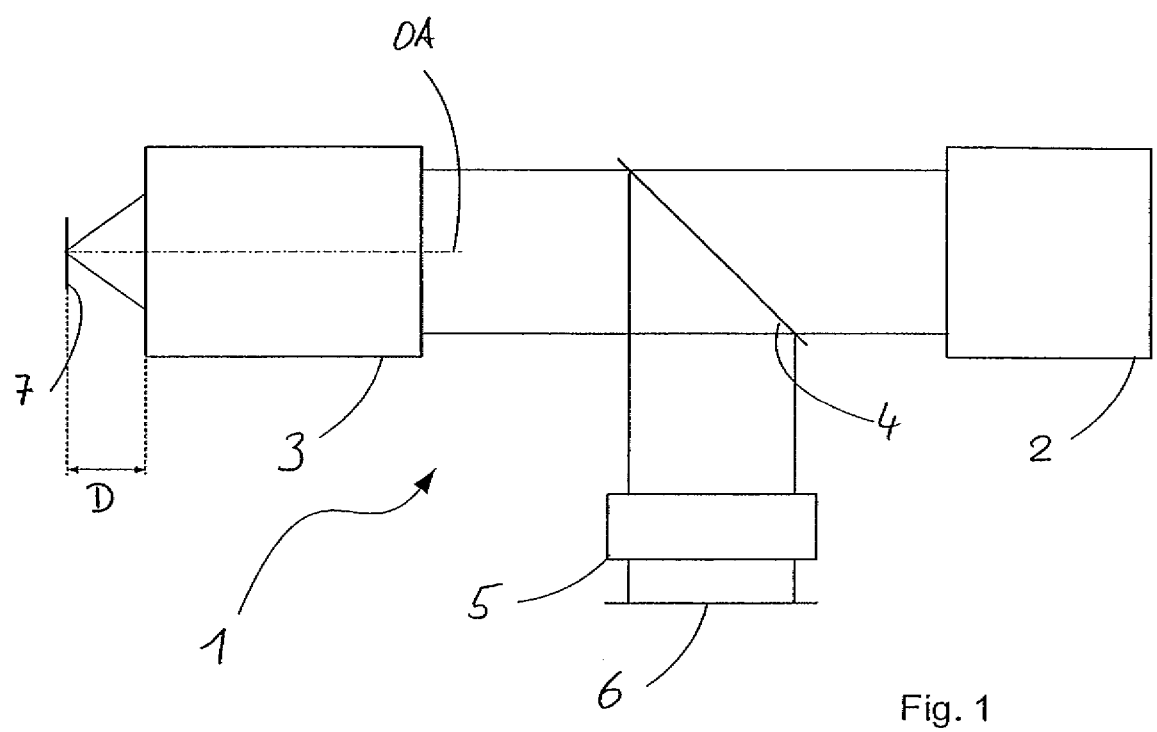
FIG. 1 is a schematic view of an embodiment of the microscope according to the invention.

The microscope schematically shown in FIG. 1 comprises a microscope objective system 1 and a source of illumination 2 which, in this case, can emit electromagnetic radiation at a wavelength of from 700-1100 nm.

The microscope objective system 1 comprises an objective 3, a color splitter 4, detector optics 5, as well as a surface detector 6 which has a circular detection area with a diameter of approximately 10 mm. The color splitter 4 is adapted to transmit the electromagnetic radiation from the source 2 and to reflect detectable radiation coming from the object or from the sample 7, respectively, and lying in a wavelength range of from 400-700 nm.

In operation, the radiation from the source 2 is transmitted by the color splitter 4 and focused on the sample 7 via the objective 3. The detected radiation coming from the sample passes through the objective 3, is reflected by the color splitter 4 to the detector optics 5 and is thereby directed onto the detector 6.

In the microscope objective system described herein, the objective is an immersion objective using water as the immersion liquid. The working distance D between the objective 3 and the sample 7 is 2.11 mm and the aperture is 0.8.

Figure 2:
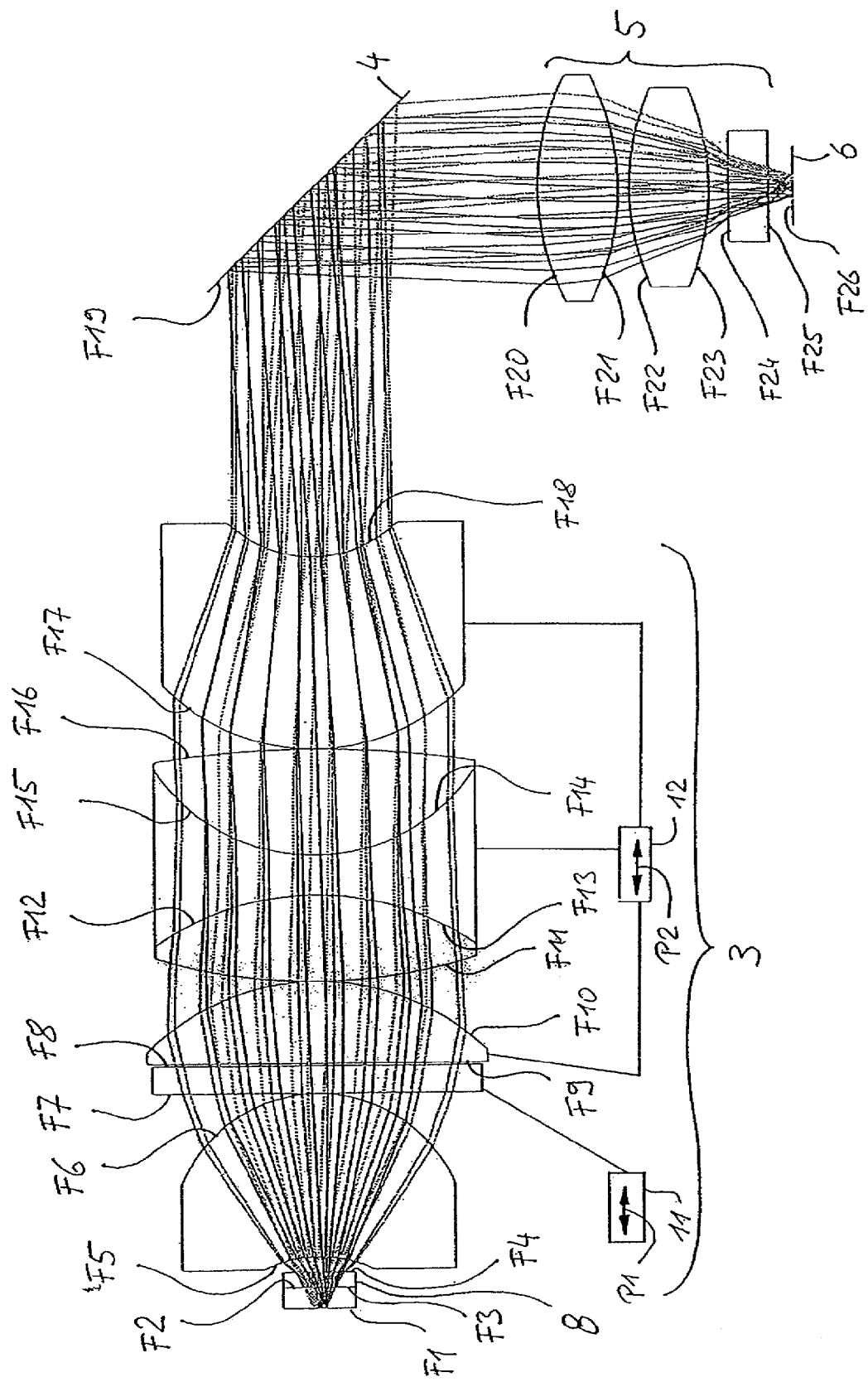
FIG. 2 depicts a lens section of the microscope objective system of FIG. 1, in which the detection beam path of the objective is illustrated.

The lens section of FIG. 2 shows the beam path for the detection radiation which is directed onto the detector 6. From the color splitter 4 up to the sample 7, this beam path also corresponds to the illumination beam path for the light from the source 2.

The exact optical structure of the objective 3 and of the detector optics is indicated in the following Tables:

TABLE 1

| Surface—Surface | Distance [mm] | Material |
|---|---|---|
| F1-F2 | 2.0 | Water |
| F2-F3 | 0.00 | |
| F3-F4 | 0.80 | Suprasil |
| F4-F5 | 0.98 | Gas (e.g. air) |
| F5-F6 | 17.37 | N-LASF31 |
| F6-F7 | 0.36 | Gas (e.g. air) |
| F7-F8 | 2.50 | Suprasil |
| F8-F9 | 0.99 | Gas (e.g. air) |
| F9-F10 | 6.86 | PSK3 |
| F10-F11 | 0.05 | Gas (e.g. air) |
| F11-F12 | 9.47 | FK5 |
| F12-F13 | 0.00 | Cement |
| F13-F14 | 4.00 | SF5 |
| F14-F15 | 0.00 | Cement |
| F15-F16 | 8.36 | N-BaLF5 |
| F16-F17 | 0.05 | Gas (e.g. air) |
| F17-F18 | 17.46 | N-LAK8 |
| F18-F19 | 37.42 | Gas (e.g. air) |
| F19-F20 | 23.00 | Gas (e.g. air) |
| F20-F21 | 8.00 | N-BK7 |
| F21-F22 | 1.20 | Gas (e.g. air) |
| F22-F23 | 8.00 | N-BK7 |
| F23-F24 | 2.00 | Gas (e.g. air) |
| F24-F25 | 4.00 | Filter |
| F25-F26 | 2.50 | Gas (e.g. air) |

TABLE 2

| Surface | Radius of curvature [mm] | Surface type |
|---|---|---|
| F1 | infinite | planar surface |
| F2 | infinite | planar surface |
| F3 | infinite | planar surface |
| F4 | infinite | planar surface |
| F5 | −14.236 | concave surface |
| F6 | −14.495 | convex surface |
| F7 | infinite | planar surface |
| F8 | infinite | planar surface |
| F9 | infinite | planar surface |
| F10 | −26.120 | convex surface |
| F11 | 42.398 | convex surface |
| F12 | −24.357 | convex surface |
| F13 | −24.357 | concave surface |
| F14 | 18.042 | concave surface |
| F15 | 18.042 | convex surface |
| F16 | −312.963 | convex surface |
| F17 | 19.022 | convex surface |
| F18 | 11.170 | concave surface |
| F19 | infinite | planar surface |
| F20 | 25.851 | convex surface |
| F21 | 25.851 | convex surface |
| F22 | 25.851 | convex surface |
| F23 | 25.851 | convex surface |
| F24 | infinite | planar surface |
| F25 | infinite | planar surface |
| F26 | infinite | planar surface |

The surfaces F12+F13 as well as F14+F15 are respectively cemented to each other. The element with the surfaces F 24 and F25 is an emission filter.

The surface F7 is provided as a diffractive surface which can be described by the following phase polynomial P(r)

$$P(r) := \sum_{i=1}^{5} a_i \cdot r^{2 \cdot i}$$

wherein $a1=2.6647\times10^{-4}$; $a2=3.985\times10^{-7}$; $a3=1.3929\times10^{-9}$; $a4=-3.1751\times10^{-13}$; $a5=-3.7438\times10^{-17}$, and r is the radial distance. The phase polynomial P(r) indicates the phase shift as a function of the radial distance r, and the grating frequency of the diffractive element can be calculated on the basis of the derivation of the phase polynomial according to the radial distance r.

FIG. 2 further schematically shows two adjusting elements 11 and 12, which together form an adjusting unit. As indicated by the double arrow P1, the adjusting element 11 allows the element with the surfaces F7 and F8 to be moved along the optical axis OA of the objective 3. Likewise, the group of optical elements with the surfaces F9-F18 can be moved together in the direction of the optical axis of the objective 3 by means of the adjusting element 12 as indicated by the double arrow P2. This makes it possible to independently adjust the distance between the surfaces F6 and F7 and the distance between the surfaces F8 and F9 by means of the adjusting elements 11 and 12. This may be utilized in order to modify the focus along the optical axis without modifying the working distance D, so that optical sections can be effected at different depths of the sample. Since the working distance D need not be changed for this purpose, this does not lead to otherwise disadvantageously appearing vibrations and transmissions of force onto the sample via the immersion liquid, which would occur during conventional focusing due to the movement of a specimen stage and/or of the objective and, thus, due to the modification of the working distance.

The necessary modification of the distances between the surfaces F6 and F7 as well as between the surfaces F8 and F9 for a defocusing range of +/−0.1 mm is indicated in the following Table 3.

TABLE 3

| Defocusing [mm] | Modification of Distance F6-F7 [mm] | Modification of Distance F8-F9 [mm] |
| --- | --- | --- |
| −0.1 | −0.16 | 0.85 |
| −0.08 | −0.12 | 0.68 |
| −0.06 | −0.09 | 0.51 |
| −0.04 | −0.06 | 0.34 |
| −0.02 | −0.03 | 0.17 |
| 0.0 | 0.0 | 0.0 |
| 0.02 | 0.03 | −0.17 |
| 0.04 | 0.06 | −0.34 |
| 0.06 | 0.09 | −0.51 |
| 0.08 | 0.12 | −0.68 |
| 0.10 | 0.15 | −0.85 |

It is further possible to achieve temperature compensation of imaging errors within a temperature range of, for example, from 20 to 40° C. by modifying the distances F6-F7 as well as F8-F9. If the objective 3 is designed for a temperature of 20° C., it is required, for an operating temperature of 30° C., to modify the distance F6-F7 by −0.0324 mm and the distance F8-F9 by 0.0109 mm. For a temperature of 40° C., the modification of the distance F6-F7 is −0.0658 mm and the modification of the distance F8-F9 is 0.0231 mm.

As adjusting elements 11 and 12, piezo-adjusting elements or other adjusting elements having the desired precision for displacement of the elements can be used.

In particular, a temperature sensor (not shown) can also be provided, which constantly measures the temperature of the objective 3 and transmits it to a control unit (not shown). As a function of the measured temperature, the control unit then controls the adjusting elements 11 and 12. Of course, such control unit may also be used to modify the focus in the above-described manner.

In the microscope shown in FIG. 1, e.g. a deflecting unit may also be arranged between the objective 3 and the color splitter 4, so that the microscope is then provided as a laser scanning microscope. The detector optics 5 may also be omitted.

The invention claimed is:

1. A microscopy method, which uses a microscope objective in a computer controlled laser scanning or immersion microscope, the microscope objective comprising an optical front element and a plurality of optical elements spaced apart from the front element and from each other, comprising:
   controlling the adjusting unit with a controller such that the adjusting unit displaces at least one of the optical elements by motion of the adjusting unit in a direction along the optical axis of the microscope objective such that a relative distance between at least two of the plurality of optical elements is changed to modify a focus relative to the front element along the optical axis substantially without altering the working distance between the front element and a microscope sample to effect optical sections within the sample according to a predetermined depth profile; and
   selecting the predetermined depth profile to be a periodic profile.

2. The method as claimed in claim 1, further comprising displacing the at least one optical element such that two distances between spaced-apart optical elements are modified independently of one another.

3. A microscopy method, which uses a microscope objective in a computer controlled laser scanning or immersion microscope, the microscope objective comprising an optical front element and a plurality of optical elements spaced apart from the front element and from each other, comprising:
   controlling the adjusting unit with a controller such that the adjusting unit displaces at least one of the optical elements by motion of the adjusting unit in a direction along the optical axis of the microscope objective such that a relative distance between at least two of the plurality of optical elements is changed to modify a focus relative to the front element along the optical axis substantially without altering the working distance between the front element and a microscope sample to effect optical sections within the sample according to a predetermined depth profile; and
   repeating the predetermined depth profile such that optical sections are obtained at the same depths in different samples.

4. The method as claimed in claim 3, further comprising displacing the at least one optical element such that two distances between spaced-apart optical elements are modified independently of one another.

* * * * *

UNITED STATES PATENT AND TRADEMARK OFFICE
CERTIFICATE OF CORRECTION

PATENT NO. : 7,855,831 B2
APPLICATION NO. : 11/459145
DATED : December 21, 2010
INVENTOR(S) : Wolleschensky et al.

It is certified that error appears in the above-identified patent and that said Letters Patent is hereby corrected as shown below:

On the title page item (57), line 1, "A microscope objective including an front" should read
--A microscope objective including a front--

In the Specifications:

Column 4, line 56, "F12+F13" should read --F12 + F13--

Column 4, line 56, "F14+F15" should read --F14 + F15--

Column 4, line 57, "F 24" should read --F24--

Column 5, line 13, "F9-F18" should read --F9 – F18--

Column 5, line 50, "F6-F7" should read --F6 – F7--

Column 5, line 51, "F8-F9" should read --F8 – F9--

Column 5, line 53, "F6-F7" should read --F6 – F7--

Column 5, line 54, "F8-F9" should read --F8 – F9--

Column 5, line 55, "F6-F7" should read --F6 – F7--

Column 5, line 56, "F8-F9" should read --F8 – F9--

Signed and Sealed this
Twenty-first Day of May, 2013

Teresa Stanek Rea
*Acting Director of the United States Patent and Trademark Office*